June 9, 1959  V. MIHULKA  2,889,727
ELECTRICALLY HEATED JEWEL SETTING APPLIANCE
Filed Aug. 3, 1956  2 Sheets-Sheet 1

Victor Mihulka
INVENTOR.

BY
Attorneys

June 9, 1959 V. MIHULKA 2,889,727
ELECTRICALLY HEATED JEWEL SETTING APPLIANCE
Filed Aug. 3, 1956 2 Sheets-Sheet 2
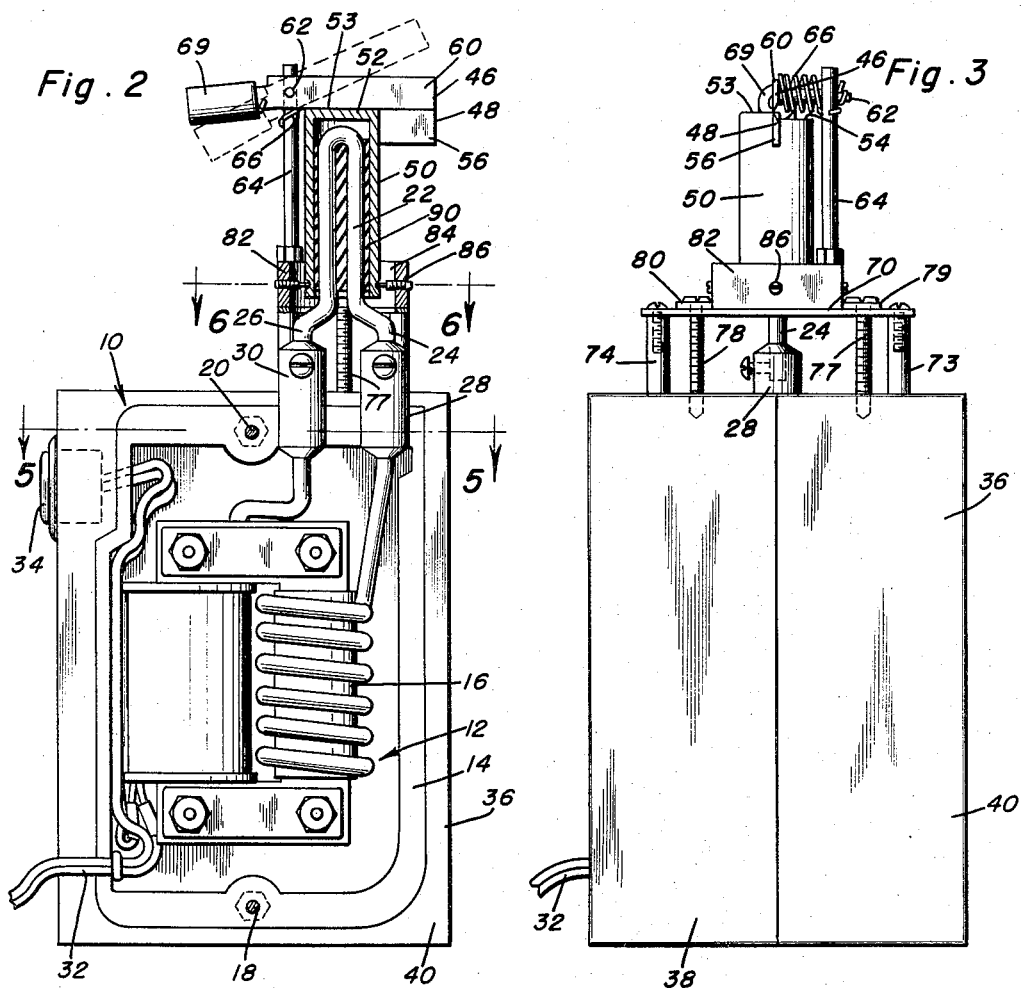
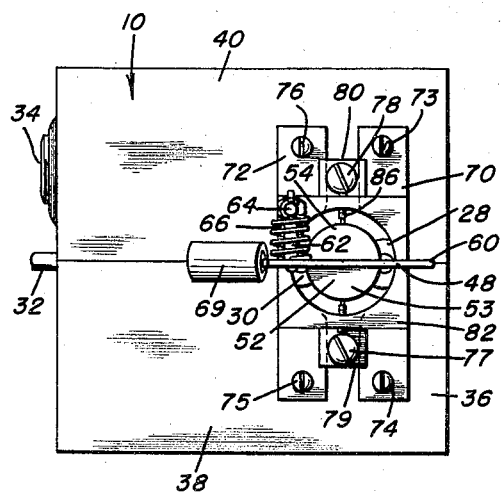
Victor Mihulka
INVENTOR.

United States Patent Office 2,889,727
Patented June 9, 1959

2,889,727

ELECTRICALLY HEATED JEWEL SETTING APPLIANCE

Victor Mihulka, Bowman, N. Dak.

Application August 3, 1956, Serial No. 601,955

5 Claims. (Cl. 81—6)

This invention relates to watchmakers' appliances and more particularly to an electrically heated jewel setter whose primary purpose is to facilitate certain jobs of the watchmaker.

It is often quite difficult to set certain jewels in or on parts of watches. For example, the stones or artificial stones on the pallet fork and roller table must be cemented in the presence of heat in order to have the jewels adhere firmly and properly. Accordingly, an object of the present invention is to provide a jewel setting appliance which conveniently and effectively holds the watch part on which the jewel is to be applied, the holding part of the appliance consisting of a pair of jaws, one being movable and the other being stationary, the stationary jaw being heated by means of an extremely fast acting heater in the presence of the stationary jaw.

One of the features of the present invention is the capability of the jewel setter to become heated exceedingly fast and to cool rapidly. This is achieved by adopting a heating mechanism patterned after the disclosures in the two Helle patents, No. 1,802,079 and No. 1,816,115, or the French patent to Tugendhat, No. 787,065, or the Weller Patent Re. 23,619.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is taken approximately on the plane of line 2—2 of Figure 1;

Figure 3 is an elevational view of the appliance in Figure 1;

Figure 4 is a top view of the appliance in Figure 1;

Figure 1:
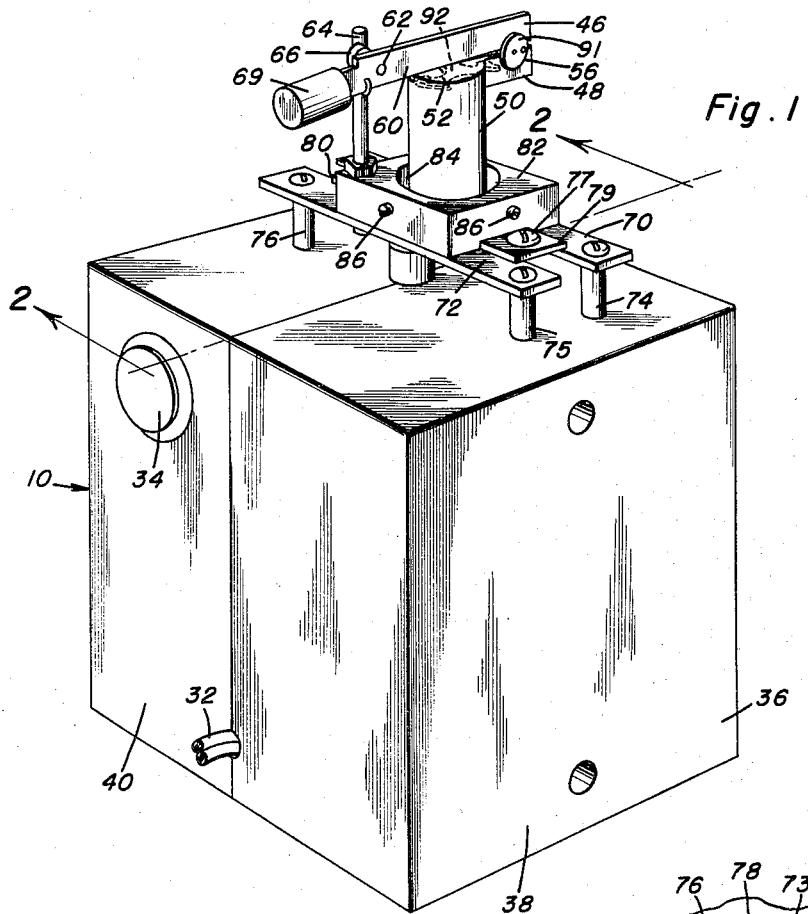
Figure 1 is a perspective view of a jewel setting appliance which is made in accordance with the invention.
Figure 5:
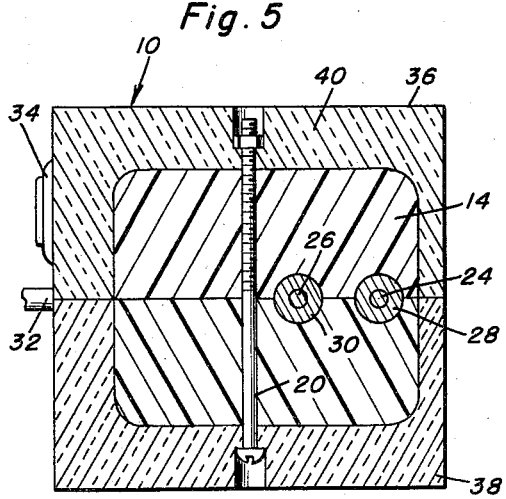
Figure 5 is a transverse sectional view taken on the line 5—5 of Figure 2.
Figure 6:
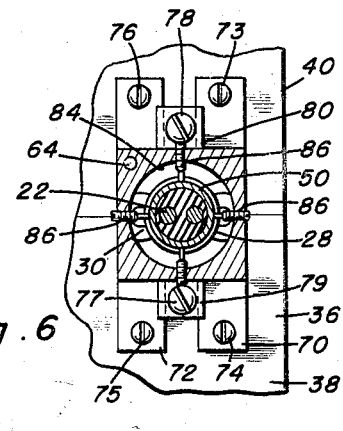
Figure 6 is a sectional view taken on the line 6—6 of Figure 2.

In practicing the invention, an appliance 10 to facilitate jewel setting exemplifies one possible embodiment by which the invention may be exemplified. The appliance 10 has been constructed to exemplify the principles of the invention and is not necessarily the final form which will be most feasible from a commercial standpoint. As seen best in Figure 2, there is an ordinary, commercially available soldering gun 12 having a casing 14 in which transformer 16 is disposed. The casing is made in two parts connected by bolts 18 and 20 and is provided with a tip 22 that has arms 24 and 26 separably mounted in sockets 28 and 30, as by set screws. Line cord 32 extends from casing 14 and is adapted to be plugged into a standard electrical receptacle in order to energize the electric heating element, which, in the illustration, is a soldering gun tip 22. The trigger type switch of the soldering gun is removed in favor of push button switch 34 carried by the base 36 of the appliance.

The base is constructed of refractory substance, for example, an electrically and heat insulating ceramic molded in two parts 38 and 40 and bolted together by the bolts 18 and 20 located in countersunk holes in the parts of the base 36. A recess is left in the base to accommodate switch 34, and passages are formed between the mating parts 38 and 40 of base 36 for the sockets 28 and 30 and for the line cord 32.

A pair of jaws 46 and 48, respectively, are carired by base 36 and are especially shaped to hold various parts of watches or other small objects and parts. Jaw 48 is stationary, while jaw 46 is movable with respect to it. The stationary jaw consists of a sleeve 50 having a top wall 52 that has an upper and lower step 53 and 54, respectively, formed therein in order to provide a stepped working surface. Blade 56 protrudes laterally from the working surface of sleeve 50 and is usable simultaneously with the working surface of the tube or in lieu of this surface 52. Movable jaw 60 is in the form of a blade having pivot pin 62 pass through it intermediate the ends thereof. The pivot pin is passed through post 64 that is ultimately carried by base 36, and there is a torsion spring 66 having one end reacting on blade 60 and the other end reacting on post 64, the bias of the spring being such as to tend to keep the jaws in the closed position so as to embrace and hold a part that is disposed therebetween. A heat insulating handle 69 is attached to one end of the jaw 46 in order to pivotally actuate it.

To explain the purpose of the stepped jaw 48, reference is made to the watch repair art. The second or minute hand of a watch has a flat part with a short sleeve at one end adapted to fit on the watch spindle. The short sleeve at one end of the watch hand is located above the lower step in the stepped jaw while the flat part of the hand fits flush against the higher part of the stepped jaw. Then, the movable jaw may be permitted to move by spring action of torsion spring 66 to clamp against the flat part of the hand only, without bending the hand as would be the case if the entire hand were supported on a flat surface. The reason that the hand cannot be simply turned over so that the short sleeve is facing upward is that some hands must be heated to apply luminous paint thereon. Certain popular luminous paints must necessarily be heated to be applied correctly, and the heating of the hand while it is being held in the manner described serves this purpose.

Another typical use of the stepped jaw is for setting jewels in the pallet fork of a watch. The pallet fork is approximately T-shaped with jewels set at the ends of the crossbar of the T. The jewel portion would be disposed above the lower step in the stepped jaw, and the longer part of the T on the upper step and held clamped in place by the automatic action of torsion spring 66. The pallet fork could then be heated for heating the cement when cementing the jewels in place.

A roller table and jewel for the roller table would use the two blades with the plane of the roller table vertical and the roller horizontal. The blades conduct the heat necessary to cement the jewel in place.

Two strips 70 and 72 are held supported on base 36 by means of bolt and sleeve assemblies 73, 74, 75 and 76, together with holddown bolts 77 and 78 which have washers 79 and 80 thereon bridging strips 70 and 72. Mounting block 82 is mounted on strips 70 and 72 and has a central passage 84 through which the lower extremity of sleeve 50 passes. The sleeve is held assembled with mounting block 82 by means of four set screws 86 which are arranged on perpendicular axes. This reduces greatly the heat transfer between sleeve 50 and mounting block 82. Previously mentioned post 64 is threaded or otherwise attached to mounting block 82 and rises generally parallel to the axis of sleeve 50.

In using the appliance, a watchmaker, jeweler, etc. desires to heat the part on which he is working as rapidly as possible. Therefore, heat insulating material 90 is packed in the sleeve 50 along the sides of the tip 22, leaving the outer extremity of the tip in contact with the top wall 50 or located very close to it. In this way, the heat is isolated and is transferred very quickly (within a matter of seconds) to the wall 52. The part that is being worked on may be a roller table 91 (Figure 1) or pallet fork 92 (Figure 1) or any other small part or object. It is placed between the jaws and the switch 34 closed. The soldering gun mechanism, including transformer 16, causes the heating element, characterized as tip 22, to be heated very rapidly in order to facilitate the cementing of jewels in place on the watch parts or to perform any other service or repair in connection therewith. Upon completion, the switch 34 is opened, permitting the jaws to cool and the part to be removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A jewel setting appliance comprising a base, a pair of jaws carried by said base, one of said jaws having a stepped surface and a first blade and stationarily carried by said base, the other of said jaws comprising a blade which is cooperable with said stepped surface and overlying the first blade, means pivotally mounting said other jaw for movement toward and away from the first jaw, means for heating the stationary jaw, said heating means including a transformer, a heating element consisting of a tip and connected with said transformer, and a switch to control the energization of said transformer.

2. An appliance for setting jewels comprising a base, a pair of jaws carried by said base, one of said jaws having a work supporting surface and a first blade and stationarily carried by said base, the other of said jaws comprising a blade which is cooperable with said surface and the first blade, means pivotally mounting said other jaw for movement toward and away from the first jaw, means for heating the stationary jaw, said heating means including a transformer, a heating element consisting of a tip and connected with said transformer, a switch to control the energization of said transformer, said stationary jaw consisting of a sleeve having a wall at one end which constitutes the work supporting surface, and said tip located in said sleeve.

3. The combination of claim 2 together with an insulating handle carried by said movable jaw for manually opening said jaws, and a spring reacting on said movable jaw and biasing said movable jaw to the closed position.

4. A watchmaker's appliance comprising a base, a heater carried by said base and having a tip, means for controlling the energization of said heater operatively connected to said heater, a pair of jaws, one of said jaws comprising a sleeve stationarily supported on said base and in heat exchange relationship with said heater by having the heater tip contained therein, means pivotally securing the other of said jaws to said base and in operative relationship to the stationary jaw, and a handle on said movable jaw with which to actuate said movable jaw.

5. The appliance of claim 4 wherein said stationary jaw is constructed of an end wall of said sleeve which has a stepped work supporting surface and a blade protruding therefrom, and the movable jaw comprises a blade which is operable in connection with said stepped supporting surface and the first mentioned blade.

References Cited in the file of this patent

UNITED STATES PATENTS

| | | |
|---|---|---|
| 751,439 | Smith | Feb. 2, 1904 |
| 1,445,595 | Jarrell et al. | Feb. 13, 1923 |
| 1,596,126 | Strutz | Aug. 17, 1926 |
| 2,230,665 | Green | Feb. 4, 1941 |
| 2,715,670 | Dicke | Aug. 16, 1955 |